United States Patent Office 3,488,212
Patented Jan. 6, 1970

3,488,212
METHOD OF FILLING OR BONDING CLEAN METAL SURFACES
Gerald W. MacIntosh, Kalamazoo, Mich., and Richard H. Mumma, Wilmington, Del., assignors to Hercules Incorporated, Wilmington, Del., a corporation of Delaware
No Drawing. Filed Apr. 5, 1967, Ser. No. 628,531
Int. Cl. B32b 15/08; B23p 7/00
U.S. Cl. 117—75         8 Claims

ABSTRACT OF THE DISCLOSURE

A method of filling and bonding metal surfaces using a particular copolyester solder composition which does not require precuring of the epoxy resin primer. An exemplary copolyester contains 70 mole percent ethylene terephthalate units and 30 mole percent ethylene azelate units.

---

This invention relates to filling depressions in the surfaces of metal members, to filling a void between two adjacent metal members, to uniting two or more metal members, and to a new composition of matter for use therein.

Metal and metal alloys have been used to fill depressions or dents in the surfaces of metal members, or to fill voids between two adjacent metal members such as a but joint in automobile bodies. Metal and metal alloys used for this purpose are usually referred to as solders. Thus, for example, lead solder, an alloy of equal parts of lead and tin, is used for filling depressions in metals, and is used to unite adjacent metal surfaces. Disadvantages attendant with the use of lead solder are high temperatures needed to melt the alloy for use, and vaporization of smal quantities of lead during heating which pose health hazards due to the poisonous nature of lead. These disadvantages are particularly troublesome in the assembly line techniques used in production of automobiles.

Attempts have been made to replace metal solders with synthetic resins which are sometimes referred to as resin solders. These attempts have not proved entirely satisfactory. Poor adhesion of the resin solder to the metal necessitated application and cure of primer coatings prior to application of the resin solder. A further problem with the resin solder was the inability of the resin solder to withstand cracking during the temperature extremes imposed by automobile assembly line operations. These temperature extremes generally range from a high of 350–375° F., during the paint baking operation to a low at atmospheric temperature conditions.

In accordance with this invention, the method for filling depressions in metal surfaces and for uniting adjacent metal surfaces comprises (1) applying to a clean metal surface a specific primer coating composed of an epoxy resin and a curing agent for the epoxy resin, (2) applying to the primed surface a copolyester solder composition comprised of a specific linear thermoplastic copolyester and a filler material, and (3) crystallizing the applied copolyester solder.

The primer which is used to provide the bond between the metal substrate and the copolyester solder is an epoxy resin, curable with either phenyl ethers, polyamides or amines.

Typical epoxy resins for use in this invention are to reaction products of epichlorohydrin and 2,2-bis(p-hydroxyphenyl) propane referred to as bisphenol A. This epoxy resin has the following theoretical structure.

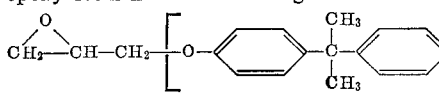

Both liquid and solid epoxy resins of this type can be employed. The epoxy resinous materials of the above structure which may be employed are available commercially as Epon, Araldite or Epi-Rez resins. Data on some of the Epon resins is given in Table I. A preferred epoxy resin for use in this invention is "Epon 1007."

TABLE I

| Epon No.: | Epoxide [1] Equivalent | Esterification [2] Equivalent | Melting Point, ° C. |
|---|---|---|---|
| 1009 | 2,400–4,000 | 220 | 145–155 |
| 1007 | 1,550–2,000 | 200 | 127–133 |
| 1004 | 870–1,025 | 175 | 95–105 |
| 828 | 175–210 | 85 | Liquid |
| 562 | 140–165 | 65 | Liquid |

[1] Weight of resin containing one equivalent of epoxide.
[2] Grams of resing to esterify completely one gram-mole of monobasic acid, e.g. 280 grams of $C_{18}$ fatty acid or 60 grams of acetic acid.

Other suitable epoxy resins are the reaction products of epichlorohydrin with other polynuclear polyhydroxy phenols such as bisphenol F (4,4'-dihydroxydiphenylmethane) 2,4,4'-trihydroxyldiphenyldimethylmethane, 4,4'-dihydroxy biphenyl and bis(4-hydroxyphenyl) sulfone.

Another series of epoxy resins satisfactory for use in this invention are the epoxidized novolac resins. These resins are obtained by condensing a phenol with an aldehyde in the presence of an acid catalyst. The epoxidized novolac resin is formed by adding the resin to epichlorohydrin and then adding an alkali metal hydroxide to the mixture so as to effect the desired condensation reaction. The epoxidized novolac resins may be ideally represented structurally as follows:

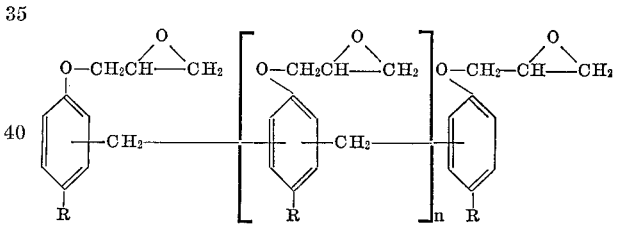

where R is hydrogen or a lower alkyl group of from 1–18 carbon atoms, and $n$ is an integer from 1 to 5.

Another series of useful epoxy resins are the glycidyl ethers of glycerol, ethylene glycol, 2,3-butanediol and erythritol, which can be prepared by reaction of epichlorohydrin with these respective alcohols.

Still other satisfactory epoxy resins are the reaction products of epichlorohydrin with mononuclear di- and trihydroxy phenols such as resorcinol, hydroquinone, pyrocatechol, saligenin, and phloroglucinol.

In general these epoxy resins can be characterized by their epoxide equivalent weight, which is defined as the weight of resin in grams which contains one gram equivalent of epoxy. The epoxy resins which may be employed in this invention have epoxy equivalent weights of about 140 to about 4000.

The curing agents which may be used with the epoxy resins to form the primers of this invention include phenol ethers, polyamides and amines.

Particularly suitable and the preferred curing agents of this invention are the allyl ethers of mono-, di-, and trimethylol phenols. These phenyl ether mixtures available

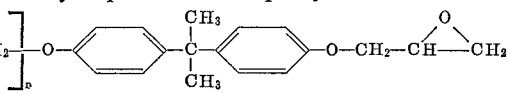

commercially as Methylon 75108 are represented by the following formula:

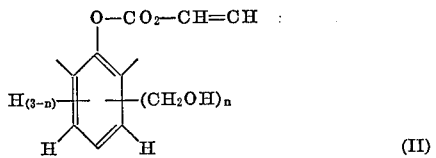

where $n=1-3$. These phenyl ether mixtures have a Gardner-Holdt viscosity at 25° C. of Y½–Z2½, viscosity in centipoises of from 2000–4000, an average density of 9.7 lbs./gal., and are about 98 percent reactive.

Suitable amine curing agents for the epoxy resins include ethylenediamine, propylenediamine, diethylenetriamine, triethylenetetramine, tetraethylenepentamine, dipropylenetriamine, N-bis(aminopropyl)methylamine, and the like.

The polyamides which can be used as curing agents for the epoxy resins are derived from the condensation of a dimeric fatty acid with various polyamines such as ethylene diamine. The term fatty acids refers to naturally occurring and synthetic monobasic aliphatic acids having hydrocarbon chains of 8–24 carbon atoms. The polyamides are available commercially as Versamid resins. The process of producing these resins is described in U.S. Patent 2,379,413. Data on some of these Versamid resins is given in Table II below.

TABLE II

| Versamid No.: | Ball and Ring Softening Point (A.S.T.M.) ° C. | Brookfield Viscosity (poises) | Amine[1] Value |
| --- | --- | --- | --- |
| 100 | 43–53 | 7–12 at 150° C | 83–93 |
| 115 | Fluid | 31–38 at 75° C | 210–220 |
| 125 | do | 7–9 at 75° C | 290–320 |

[1] Milligrams of KOH equivalent to base content of one gram of polyamide as determined by HCL Titration.

The primer compositions can be comprised by weight from about 45% to about 95% epoxy resin and from about 5% to about 55% of the curing agent. A preferred formulation of this invention is 70 weight percent epoxy resin (Epon 1007) and 30 weight percent of phenyl ether curing agent (Methylon 75108).

The primers are applied to the metal substrate in the form of a solution. Simple mixing of the epoxy resin and curing agent in a solvent such as methyl ethyl ketone or toluene is sufficient. The metal substrate to be coated is cleaned prior to priming. The metal surface must be devoid of all dirt, oil, rust or grease in order to obtain a good primer to metal bond. The primer solution is applied by any convenient method, such as brushing, to the metal substrate and the solvent allowed to evaporate. Evaporation rate may be increased by blowing air over the primed area.

The thickness of the primer coating on the metal substrate can vary from .05 to 1 mil, but preferably is from about 0.2 to about 0.5 mil. The primer thickness as applied is dependent on the percentage of solids dissolved in the primer solution. The primer solution will preferably contain between eight and seventeen weight percent solids based on the total weight of the primer solution in order to obtain the preferred primer coating thickness. No precure of the primer is required after the solvent has been evaporated.

The linear thermoplastic copolyester which forms the polymer portion of the copolyester solders of this invention can be and preferably are derived by the ester interchange and polymerization process disclosed in U.S. 3,057,828.

These copolyesters are derived by reacting under polyester forming conditions ethylene glycol, terephthalic acid and azelaic acid. Isophthalic acid or hexahydroterephthalic acid or mixtures thereof can be used as a replacement for a part of the azelaic acid component of the copolyester. The ester forming derivatives of these acids such as dimethylterephthalate, dimethylazelate, dimethylisophthalate and dimethylhexahydroterephthalate can be used in place of and are the full equivalents of the above acids, as is generally the case of the manufacture of linear polyesters.

It is necessary that the terephthalic acid comprises at least 70 mole percent but not more than 85 mole percent of the total acid component of the final copolyester. The azelaic acid component must comprise at least 15 mole percent but not more than 30 mole percent of the total acid component. When used, the isophthalic acid and hexahydroterephthalic acid components, singly or in combination with each other, can comprise up to 15 mole percent of the total acid components of the final polymer.

The acid components will be present in the final polymer in the same ratio as they were present in the initial reactants provided an excess of glycol is used. Thus, the amount of ethylene glycol used in the initial reaction mixture will be in excess of 1 mole and preferably from about 1.8 to 2.2 moles, per mole of acid component.

The product of the reaction between ethylene glycol and the acids of this invention is heated at elevated temperatures and at a reduced pressure to produce a high molecular weight polymer having a specific viscosity of at least about 0.5 and preferably at least about 0.7, as measured at 25° C., in a 1% solution of the polymer in a 60/40 mixture by weight of phenol and tetrachloroethane. Thus, the polymer portion of the copolyester solder is composed of linear molecules of high average molecular weight in which up to four kinds of repeating units, ethylene isophthalate, ethylene azelate, ethylene hexahydroterephthalate and ethylene terephthalate can be distributed at random along the molecule chain. The polymer portion of the copolyester solder comprises from about 60 to about 40 percent by weight of the copolyester solder.

The fillers which are admixed with the polymer of this invention to form the copolyester solder composition are employed in amounts from about 40 to about 60 weight percent based on the weight of the copolyester solder. Above about 60 weight percent filler, the flow properties of the copolyester solder are adversely affected, which may result in a non-wetting of the polymer mass to the primer coating. It is critical to the process of this invention that the polymer be completely wetted to the primer interface, in order to obtain a proper bond during curing. Failure to wet out the polymer results in adhesion failure of the polymer to the primer. If below about 40 weight percent filler is used, the filler will not impart sufficient stability to the polymer to prevent sag at temperatures of 375–380° F.

The fillers which are incorporated into polymers are selected based on their coefficient of expansion, and in general should be chosen so that the copolyester solder coefficient of expansion matches as closely as possible the coefficient of expansion of the metal substrate to be coated, filled or joined. The function of the filler is to prevent dimensional change of the polymer, which could weaken or break the solder-to-metal bond, and to add stability to the solder at elevated temperatures, thus increasing the solder sag temperature. Sag temperature is defined as the temperature at which the solder begins to distort. In this way undue stresses are not set up during temperature cycling as a result of dissimilar degrees of expansion. Particularly satisfactory fillers include iron oxide ($Fe_2O_3$), barytes ($BaSO_4$), china clay (natural aluminum silicate), calcium carbonate, Wollastonite (calcium metasilicate), talc (magnesium silicate) and asbestine (a finely divided powdery asbestos). The fillers are generally added in granular form in particle size ranging from about 5 to 50 microns for the iron oxide and in general should be as small as possible, and in the range from 1 micron to 100 microns.

The fillers can be incorporated into the polymer by any convenient method, such as differential speed two-mill rolling of filler and polymer, or coextrusion of polymer and filler.

Thixotropic agents can be used as auxiliary fillers, such as finely divided silica flour, available commercially as "Cab-O-Sil." This filler can be included in the copolyester solders in amounts from about 1 to about 8% by weight based on the weight of the copolyester solder. Other materials which can be used for the purpose of thickening or gelling the copolyester solder include finely divided carbon black of 1 to 5 micron particle size, and bentonite complexes produced by the reaction of bentonite (naturally occurring hydrated aluminum silicate) with organic bases with particle sizes of 100 microns or less, available commercially as "Bentone." The thickening agents can be used separately or in various combinations and can constitute from about 1% to about 10% by weight of the total weight of the copolyester solder.

The method utilized in filling and bonding metal surfaces with the copolyester solder is dependent in general upon the physical characteristics and spacial orientation of the metal surface, i.e., whether the metal surface is horizontal, vertical, oblique to the horizontal or vertical, curved, or possibly a combination of one or more of these or other physical characteristics. The method will also be dependent on whether assembly line operations are involved, or if only one or several metal surfaces are to be filled or bonded. The two general methods for filling or bonding a metal surface are based on application of the copolyester solder as a molten liquid and application of the copolyester solder as a solid with subsequent heating and fusion of the primer and copolyester solder. The method of application chosen will be determined after consideration of the above enumerated factors.

Application of the copolyester solder as a molten liquid

To apply the copolyester solder as a molten liquid, it is heated to a temperature of from about 200° C. to about 270° C. Prior to application of the molten copolyester solder the primed metal substrate should be heated to about 175° C. to about 250° C. Application of the molten copolyester solder to the primed metal surfaces at temperatures below about 175° C. result in incomplete wetting out of the primer and the copolyester solder. If the metal substrate and primer are heated to above about 250° C., the primer composition will start to decompose. Both conditions result in lowered primer-to-copolyester solder bond strengths.

The molten copolyester solder can be applied immediately to the primed metal substrate when the substrate temperature reaches about 175° C. Thus, no precure of the primer is required in order to achieve a good primer to solder bond. It is not necessary to apply the copolyester solder immediately. For best results however, the copolyester solder should be applied to the heated metal substrate within about two minutes from the time the substrate attains a temperature of about 175° C.

The molten copolyester solder is applied to the heated metal substrate at a temperature above the polymer melting point to insure good flow. The molten copolyester solder temperature can be from about 200° C. to about 270° C. Above about 270° C. the polymer will start to decompose. Below about 200° C. the polymer viscosity is too high to give acceptable flow properties resulting in incomplete wetting out of the polymer to the primer. A preferred temperature range of the molten copolyester solder for application to the primed metal substrate is from about 240° C. to about 250° C.

Following the application of the molten copolyester solder to the metal substrate, the filled metal substrate is allowed to cool. The polymer portion of the molten copolyester solder will crystallize during this cooling period. Crystallization is necessary to impart to the polymer the mechanical properties necessary for it to withstand high temperatures, and hot-cold cycling. Crystallization will take place at a temperature above the glass transition temperature of the polymer. The polymer should be maintained above its glass transition temperature for a long enough time to insure complete crystallization. For the polymers of this invention the time will range from about 5 to about 30 minutes at a temperature above from about 100° C. to about 140° C. depending on the formulation chosen.

Application of the copolyester solder as a solid

The copolyester solder is applied as a solid to the metal surface to be filled or bonded by covering a previously primed area with sufficient small solid particles of the copolyester solder to fill the desired area when the solder is melted. The primed metal surface and copolyester solder are then fused by heating to a temperature of from about 200° C. to about 250° C. by any convenient method such as in an oven, with heat lamps, or with a heated hydraulic press. The solid copolyester solder particles must be kept in contact with the primed metal surface during heating. The exact conditions of temperature and time at temperature required to fuse the primer and copolyester solder are dependent on source of heat and formulation of the copolyester solder. Following the fusion or melting out of the copolyester solder and primer, the filled metal substrate is allowed to cool. The polymer portion of the molten copolyester will crystallize during this cooling period. Crystallization conditions are the same as for application of the copolyester solder in the molten state.

EXAMPLE 1

Dimethyl terephthalate, and dimethyl azelate are reacted with ethylene glycol under the conditions and process as disclosed in U.S. Patent 3,057,828. The resulting linear copolyester is comprised of 30 mole percent ethylene azelate units and 70 mole percent ethylene terephthalate units. The copolyester thus produced is then dried. Fifty (50) parts of this copolyester are mixed with 50 parts of iron oxide filler of 5 to 50 micron particle size, and placed on a differential speed two-roll mill at 350° F. for 15–20 minutes. The filler-copolyester blend now forming the copolyester solder is removed from the mill, cut into small pieces, mixed with Dry Ice and chopped into three- to ten-mesh particles (chips). The copolyester solder chips are dried for twelve hours prior to use, at 95° C. and 1 mm. Hg.

EXAMPLE 2

Example 1 is repeated with the exception that the filler consists of 10 parts iron oxide and 40 parts barytes ($BaCO_4$).

EXAMPLE 3

Example 1 is repeated with the exception that the filter consists of 2.5 parts finely divided silica flour (Cab-O-Sil) and 47.5 parts of iron oxide.

EXAMPLE 4

A copolyester solder is prepared according to the method of Example 1, with the polymer composition consisting of 10 mole percent ethylene isophthalate, 20 mole percent ethylene azelate and 70 mole percent ethylene terephthalate.

EXAMPLE 5

A copolyester solder is prepared according to the method of Example 1, with the polymer composition consisting of 15 mole percent ethylene hexahydroterephthalate, 15 mole percent ethylene azelate, and 70 mole percent ethyleneterephthalate.

EXAMPLE 6

A primer solution is prepared by mixing 100 parts of the allyl ethers of mono-, di-, and trimethylol phenol (Methylon 75108), 233 parts of epoxy resin (Epon 1007) and 1630 parts of methyl ethyl ketone. Mixing is continued until all solids are dissolved.

EXAMPLES 7-11

The copolyester solders of Examples 1–5 are tested for sag temperature and hot-cold cycling. The hot-cold cycling tests consist of placing the test specimens in an air oven at 350° F. for 20 minutes, and then cooling rapidly to room temperature by using a water quench. This cycle is repeated five times.

The steel test specimen for the hot-cold cycling tests are obtained from Deuel Metal Company (No. 56-Zu-106). The test specimen is cleaned by washing with methylene chloride to remove all dirt and grease from the metal surface. The primer solution as prepared in Example 6 is brushed onto the metal test specimen and the solvent is evaporated by blowing with dry air.

Twenty-five (25) parts of the copolyester solder are placed on the test specimen in a Teflon lined holder and covered with a Teflon coated metal sheet. The test specimens are then placed in a hydraulic press, operating at 250° C. for 12 minutes. The press cycle consists of six minutes at contact pressure (0 p.s.i.g.), five minutes of pressure build-up to 75–100 p.s.i.g., and one minute at maximum pressure (75–100 p.s.i.g.). After the pressure release, the polymer is crystalized by holding it at 140° C. for 10 to 30 minutes. After cooling to less than 30° C. the test samples are removed from the press, and the sides sanded and filed prior to hot-cold cycling.

Test specimens for measuring sag temperature consist of pieces of cold rolled steel with a 4″ x 1½″ x ⅛″ depression stamped into them. The specimens are filled with the copolyester solders as prepared in Examples 1–5 and the primer and copolyester solder fused utilizing a hydraulic press and procedure specified. The specimens are hung vertically in a circulating air oven at various temperatures until the sag temperature is reached.

Solder sag temperatures and hot-cold cycling for the solders prepared are all acceptable as shown in Table 1.

TABLE 1

| | Polyester Solder of | Sag Temp.,° F. | Condition After Hot-Cold Cycles |
|---|---|---|---|
| Example: | | | |
| 7 | Example 1 | 375 | Very slight cracking of metal-solder interface. |
| 8 | Example 2 | 365 | Do. |
| 9 | Example 3 | 385 | No cracking. |
| 10 | Example 4 | 375 | Do. |
| 11 | Example 5 | 375 | Do. |

Examples 12, 13 and 14 which follow are used to illustrate the excellent bond strengths obtainable using the copolyester solder compositions and method of this invention, without precure of the primer system. Three primer compositions are illustrated.

EXAMPLE 12

Metal test specimens used for the bond strength tests are 4″ x 1″ x ¹⁄₁₆″ cold rolled steel strips. The test specimens are made up in triplicate for testing as follows. The metal strips are cleaned with methylene chloride. The primer, prepared in Example 6, is applied to one side of the metal test strips and the solvent is evaporated. Copolyester solder chips prepared in Example 1 are placed on a primed strip. A second primed strip is placed on top of the copolyester chips giving an overlap of the two metal strips of about one-half inch. The strips are placed in a jig to prevent movement during molding and to maintain a glue line thickness of 25–30 mils.

The whole assembly (test strips, copolyester solder and jig) is placed in a press at 250° C. The press procedure is the same used in Examples 7–11 except a 5 minute press cycle is used. The fused copolyester solder and primer are cooled for 10 minutes until the polymer portion of the solder is crystallized. These specimens are tested for lap shear strength according to ASTM Method D–1002. Lap shear strength for the average of three tests is 3,150 p.s.i.

EXAMPLE 13

Example 12 is repeated with the exception that the primer solution is prepared by mixing 100 parts of a polyamide curing agent (Versamid 115) with 100 parts of epoxy resin, Epon 828, and 976 parts of methyl ethyl ketone solvent. Lap shear strength for the average of three tests is 3000 p.s.i.

EXAMPLE 14

Example 12 is repeated with the exception that the primer solution is prepared by mixing 5 parts of triethylene tetraamine curing agent with 95 parts of epoxy resin, Epon 1004, and 300 parts of methyl ethyl ketone solvent. Lap shear strength for the average of three tests is 3200 p.s.i.

What we claim and desire to protect by Letters Patent is:

1. A method of filling or bonding clean metal surfaces, which comprises:
    applying to said metal surfaces a primer composition comprising
        from about 45 to about 95 percent by weight of an epoxy resin and
        from about 5 to about 55 percent by weight of a curing agent,
    whereby said surfaces are primed,
    applying to said primed metal surfaces a copolyester composition at a temperature sufficient to effect fusion of the copolyester composition and the primer composition, said copolyester composition comprising
        from about 40 to about 60 percent by weight of a filler and
        from about 60 to about 40 percent by weight of a copolyester resin comprising
            from 70 to 85 mole percent ethylene terephthalate units,
            at least 15 mole percent ethylene azelate units and
            from 0 to 15 mole percent of units selected from the group consisting of ethylene azelate, ethylene isophthalate, ethylene hexahydro terephthalate and mixtures thereof, and
    crystallizating the fused copolyester resin.

2. The method of claim 1 in which the primed metal surfaces and copolyester composition are heated to a temperature of from about 175° C. to about 270° C. prior to contacting the primed metal surfaces with the copolyester composition.

3. The method of claim 1 in which the primed metal surfaces are contacted with the copolyester composition prior to heating, with subsequent heating of he primed metal surfaces and the copolyester composition to a temperature of from about 175° C. to about 270° C.

4. The method of claim 1 wherein the copolyester resin is comprised of 70 mole percent ethylene terephthalate units and 30 mole percent ethylene azelate units.

5. The method of claim 4 wherein the filler comprises iron oxide and from 0 to 5 percent by weight of finely divided silica.

6. The method of claim 4 wherein the filler is comprised of 20 percent by weight iron oxide and 80 percent by weight barytes.

7. The method of claim 4 wherein the epoxy resin portion of the epoxy primer is a reaction product of epichlorohydrin and bisphenol A, and the curing agent is a phenyl ether.

8. The method of claim 7 wherein the epoxy primer composition comprises 70 percent by weight of epoxy resin and 30 percent by weight of curing agent.

References Cited

UNITED STATES PATENTS

| | | |
|---|---|---|
| 2,523,625 | 9/1950 | Jones et al. _____ 171—2 |
| 2,683,100 | 7/1954 | Edgar et al. |
| 3,008,848 | 11/1961 | Annonio _____ 117—75 X |
| 3,013,914 | 12/1961 | Willard. |
| 3,164,488 | 1/1965 | Workman. |

WILLIAM D. MARTIN, Primary Examiner

R. HUSACK, Assistant Examiner

U.S. Cl. X.R.

117—42, 2, 132, 161; 156—94; 260—37